United States Patent
Soula et al.

(10) Patent No.: US 11,872,769 B2
(45) Date of Patent: Jan. 16, 2024

(54) METHOD FOR MANUFACTURING CONNECTING MEMBERS FOR CONNECTING AN AIRCRAFT WING TO A CENTER WING BOX, USING PREFORMS

(71) Applicant: AIRBUS OPERATIONS S.A.S., Toulouse (FR)

(72) Inventors: Denis Soula, Toulouse (FR); Tanguy Vercamer, Toulouse (FR); Jago Pridie, Nantes (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 145 days.

(21) Appl. No.: 16/779,883

(22) Filed: Feb. 3, 2020

(65) Prior Publication Data

US 2020/0247067 A1 Aug. 6, 2020

(30) Foreign Application Priority Data

Feb. 4, 2019 (FR) ...................................... 1901071

(51) Int. Cl.
| | |
|---|---|
| *B29C 65/70* | (2006.01) |
| *B29C 65/02* | (2006.01) |
| *B29C 65/00* | (2006.01) |
| *B29C 70/48* | (2006.01) |
| *B64C 1/26* | (2006.01) |
| *B29L 31/30* | (2006.01) |
| *B29K 307/04* | (2006.01) |
| *B29K 309/08* | (2006.01) |

(52) U.S. Cl.
CPC .............. *B29C 65/70* (2013.01); *B29C 65/02* (2013.01); *B29C 66/721* (2013.01); *B29C 70/48* (2013.01);

(Continued)

(58) Field of Classification Search
CPC ....... B29C 65/70; B29C 65/02; B29C 66/721; B29C 70/48; B29C 65/10;

(Continued)

(56) References Cited

U.S. PATENT DOCUMENTS

| | | | |
|---|---|---|---|
| 3,499,622 A | 3/1970 | Lugan et al. | |
| 4,591,114 A | 5/1986 | Block | |

(Continued)

FOREIGN PATENT DOCUMENTS

| | | |
|---|---|---|
| DE | 8714732 U1 | 3/1989 |
| DE | 102004055592 A1 * | 5/2006 |

(Continued)

OTHER PUBLICATIONS

DE102004055592A1 Machine Translation of Description (EPO/Google) (Year: 2022).*
"Intersection" definition; Merriam-Webster online. (Year: 2022).*

*Primary Examiner* — Cynthia L Schaller
(74) *Attorney, Agent, or Firm* — Greer, Burns & Crain, Ltd.

(57) ABSTRACT

A method is disclosed for manufacturing connecting members for connecting an aircraft wing to a center wing box, using preforms. The method involves a step of manufacturing at least one preform made of composite material forming the connecting member, and a step of assembling the preform or preforms by heat treatment to form the connecting member. The manufacturing method makes it possible, simply and quickly, to manufacture a connecting member that contributes to the connection between a center wing box of an aircraft and a wing of the aircraft.

12 Claims, 6 Drawing Sheets

(52) U.S. Cl.
CPC ............ *B64C 1/26* (2013.01); *B29K 2307/04* (2013.01); *B29K 2309/08* (2013.01); *B29L 2031/3085* (2013.01)

(58) Field of Classification Search
CPC ............ B29C 66/73752; B29C 65/562; B29C 66/0326; B29C 66/73941; B29C 66/131; B29C 66/7212; B29C 65/62; B29C 66/112; B29C 66/1122; B29C 66/1312; B64C 1/26; B64C 2001/0072; B29K 2307/04; B29K 2309/08; B29L 2031/3085; B29L 2031/3082; Y02T 50/40
See application file for complete search history.

(56) References Cited

U.S. PATENT DOCUMENTS

| | | | |
|---|---|---|---|
| 4,915,665 A | 4/1990 | Ming | |
| 2002/0081415 A1* | 6/2002 | Toi | B29C 70/443 |
| | | | 428/102 |
| 2009/0050263 A1* | 2/2009 | Suzuki | B29B 11/16 |
| | | | 156/245 |
| 2009/0146007 A1 | 6/2009 | Keeler et al. | |
| 2011/0049750 A1* | 3/2011 | Bechtold | B29D 99/0005 |
| | | | 264/177.1 |
| 2013/0020440 A1 | 1/2013 | Honorato Ruiz | |
| 2013/0287479 A1* | 10/2013 | Valembois | F16B 7/00 |
| | | | 264/248 |
| 2016/0089856 A1* | 3/2016 | Deobald | B32B 7/04 |
| | | | 244/119 |
| 2016/0101543 A1* | 4/2016 | Fisher, Jr. | B29C 70/081 |
| | | | 428/688 |

FOREIGN PATENT DOCUMENTS

| | | |
|---|---|---|
| EP | 2730498 A2 | 5/2014 |
| EP | 2730498 A3 | 11/2017 |
| FR | 2915176 A | 10/2008 |
| FR | 2948099 A1 | 1/2011 |

* cited by examiner

METHOD FOR MANUFACTURING CONNECTING MEMBERS FOR CONNECTING AN AIRCRAFT WING TO A CENTER WING BOX, USING PREFORMS

CROSS-REFERENCE TO PRIORITY APPLICATION

This application claims the benefit of, and priority to, French patent application number 1901071, filed Feb. 4, 2019. The content of the referenced application is incorporated by reference herein.

TECHNICAL FIELD

The present disclosure relates to a method for manufacturing connecting members contributing to the connection between a center wing box of an aircraft and a wing of the aircraft. The disclosure also relates to a connecting member manufactured using said manufacturing method and to an aircraft comprising at least one such connecting member.

BACKGROUND

An aircraft comprises a fuselage and wings which are generally connected to the fuselage by means of a center wing box. The wings are fixed to the center wing box by a root joint comprising connecting members. The connecting members in general comprise profile sections the transverse cross sections of which are cross-shaped or T-shaped. The root joint has the main function of transferring load from the wings to the center wing box. It has the secondary function of transferring load from the fuselage of the aircraft to the center wing box. The connecting members are made of metal and are manufactured by forging. They are therefore expensive to manufacture and require a long manufacturing time.

BRIEF SUMMARY

It is an object of the present disclosure to alleviate these disadvantages by proposing a method for manufacturing connecting members which is quick and inexpensive to implement.

To this end, the disclosure relates to a method for manufacturing a connecting member configured to contribute to the connection between a center wing box of an aircraft and a wing of the aircraft.

According to the disclosure, the manufacturing method comprises the set of the following steps:

a step of manufacturing at least two preforms made of composite material forming the connecting member;

a step of assembling the preforms by heat treatment in order to form the connecting member.

Thus, manufacturing preforms made of composite material and assembling them makes it possible to obtain connecting members quickly and simply and at lower cost. The connecting members thus manufactured meet the stress requirements for the transfer of load between the wings and the center wing box and the transfer of load to the fuselage of the aircraft.

According to a first particular feature, the manufacturing step comprises a first manufacturing sub step that manufactures a main preform in the form of a strip having a first longitudinal axis and having a first surface opposite to a second surface.

According to a second particular feature, the manufacturing step comprises at least a second manufacturing substep that manufactures at least one L-shaped preform, the L shaped preform corresponding to a profile section having a second longitudinal axis the transverse cross section of which is L shaped comprising a first web perpendicular to a second web.

In addition, the first manufacturing substep comprises the manufacture of at least one main preform and the second manufacturing sub step comprises the manufacture of at least two L-shaped preforms which are intended to be adjacent to one another, and the assembly step then comprises at least the assembly by heat treatment:

of the second web of the at least two L shaped preforms to the first surface of the main preform, of the first web of one of the two L shaped preforms to the first web of the other of the two L-shaped preforms.

Furthermore, the preforms are manufactured in such a way that the main preform has ends which lie flush with the second webs of the L-shaped preforms when the preforms are assembled, the L shaped preforms having ends which lie flush with one another.

Moreover, the main preform has continuous reinforcers parallel to the first longitudinal axis, and the L-shaped preforms have continuous reinforcers parallel to the second longitudinal axis.

According to a first embodiment, the manufacturing step comprises:

a first manufacturing sub step that manufactures a main preform, and four second manufacturing substeps to manufacture respectively a first L-shaped preform, a second L-shaped preform, a third L-shaped preform and a fourth L-shaped preform, and the assembly step comprises:

a preforms-assembly substep that assembles the preforms manufactured in the first manufacturing substep and the second manufacturing substeps, the preforms being assembled so that the connecting member formed by the preforms has a cruciform transverse cross section by ensuring that:

the first web of the first L-shaped preform is butted against the first web of the second L-shaped preform, the second web of the first L-shaped preform and the second web of the second L-shaped preform are butted against the first surface of the main preform, the first web of the third L-shaped preform is butted against the first web of the fourth L-shaped preform, the second web of the third L-shaped preform and the second web of the fourth L-shaped preform are butted against the second surface of the main preform, the first longitudinal axis of the main preform is parallel to the second longitudinal axes of the L-shaped preforms, a heat treatment substep that heat treats the preforms assembled in the assembly sub step.

According to a second embodiment, the manufacturing step comprises:

a first manufacturing sub step that manufactures a main preform, and two second manufacturing substeps to manufacture respectively a fifth L-shaped preform and a sixth L-shaped preform, and the assembly step comprises:

a preforms-assembly substep that assembles the preforms manufactured in the first manufacturing substep and the second manufacturing substeps, the preforms being assembled so that the connecting member formed by the preforms has a T-shaped transverse cross section by ensuring that:

the first web of the fifth L-shaped preform is butted against the first web of the sixth L-shaped preform, the second web of the fifth L-shaped preform and the second web of the sixth L-shaped preform are butted against the first surface of the main preform, the first longitudinal axis of the main preform is parallel to the second longitudinal axes of the L-shaped preforms, a heat treatment substep that heat treats the preforms assembled in the assembly substep.

Furthermore, the assembly step comprises a stitching substep following the substep of assembling the preforms, wherein the stitching substep adds reinforcing fibers by stitching in order to attach the preforms to one another.

Moreover, the manufacturing step comprises manufacturing the preforms by continuous forming.

In addition, the second manufacturing substep comprises manufacturing the L-shaped preform by pultrusion, the second manufacturing substep comprising:

a continuous manufacturing substep that continuously manufactures a strip made of composite material formed of a superposition of plies of fibers comprising the first web and the second web, a continuous folding substep that continuously folds the strip in such a way that the first web becomes perpendicular to the second web in order to form the L-shaped profile section.

Furthermore, the second manufacturing substep further comprises a bending substep following the folding substep, wherein the bending substep curves the L-shaped profile section in the direction of the second longitudinal axis so that the second web becomes curved and the first web remains planar.

Advantageously, during the continuous manufacturing substep, the strip is manufactured in such a way that the first web of the L-shaped preform or preforms comprises a collection of fibers having a direction that makes a non-zero angle with respect to the second longitudinal axis of the L-shaped preform or preforms.

Moreover, the continuous manufacturing substep comprises a substep of incorporating additional fiber plies between the fiber plies of the strip made of composite material, in a region of the strip that corresponds to the first web after the folding substep.

Furthermore, the method further comprises a finishing step following the assembly step, the finishing step comprising:

a substep of machining fixing holes configured to fix the connecting member at least to the center wing box and to a wing of the aircraft, a substep of machining insertion slots which are configured for inserting alignment ribs arranged on the center wing box and on the wing.

Advantageously, the heat treatment corresponds to a copolymerization or a co-consolidation.

The disclosure also relates to a connecting member configured to contribute to the connection between a center wing box and a wing of an aircraft.

According to the disclosure, the connecting member comprises at least two preforms made of composite material assembled by heat treatment.

According to a first configuration, the connecting member comprises at least one main preform in the form of a strip having a first longitudinal axis.

According to a second configuration, the connecting member comprises at least one L-shaped preform, the L-shaped preform corresponding to a profile section having a second longitudinal axis of which the transverse cross section is L-shaped comprising a first web perpendicular to a second web.

The disclosure also relates to an aircraft comprising wings and a center wing box.

According to the disclosure, the wings are fixed to the center wing box by means of at least one connecting member as specified hereinabove.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The subject matter presented here, with its features and advantages, will become more clearly apparent from reading the description given with reference to the attached drawings in which.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
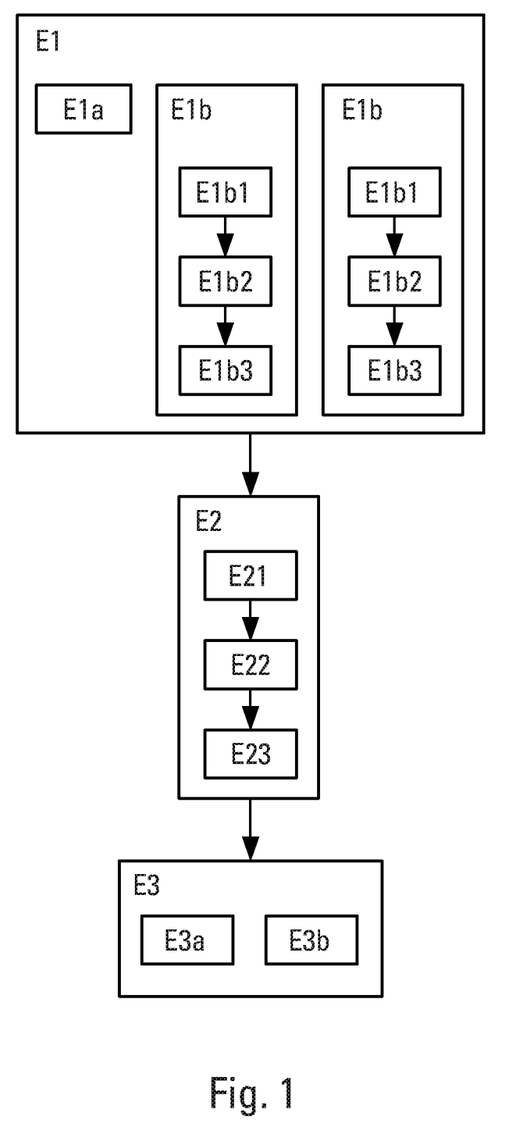
FIG. 1 depicts a block diagram of one embodiment of the manufacturing method.
Figure 2:
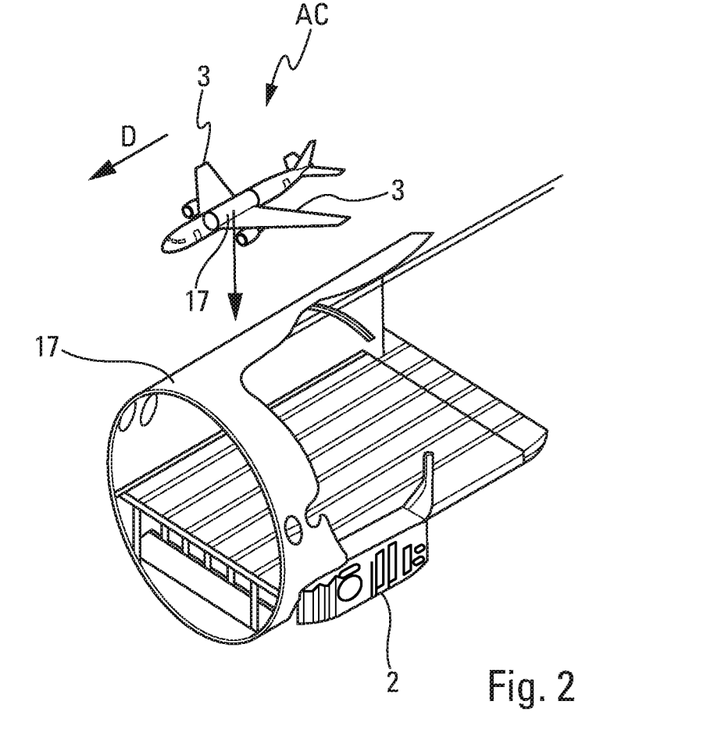
FIG. 2 depicts a perspective view of an aircraft, of which an aircraft fuselage portion comprising a center wing box is depicted in enlarged format.
Figure 9:
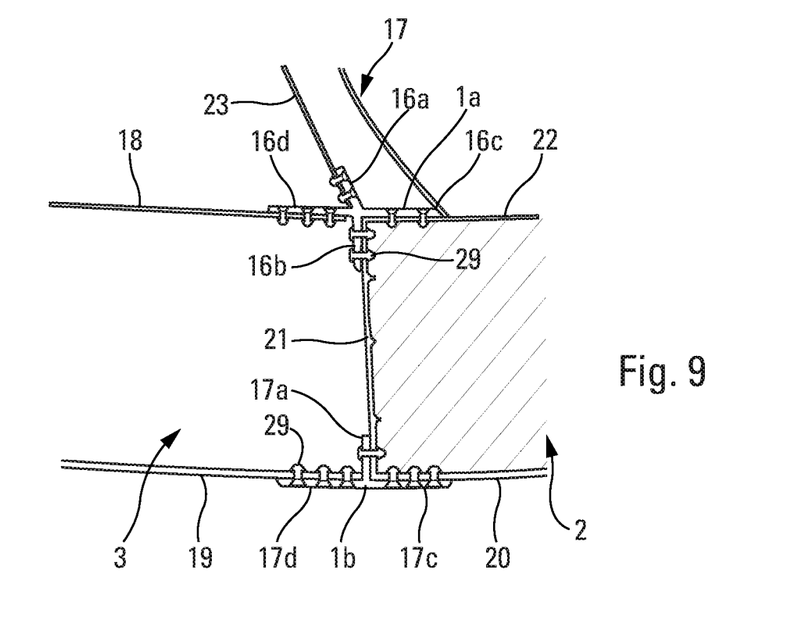
FIG. 9 depicts a transverse cross section of a center wing box to which a wing is fixed by connecting members.

FIG. 1 depicts the method for manufacturing a connecting member $1a$, $1b$, $1c$ which is configured to contribute to the connection between a center wing box 2 of an aircraft AC, particularly a transport airplane, and a wing 3 of the aircraft AC (FIG. 2 and FIG. 9).

The manufacturing method comprises a step E1 of manufacturing at least two preforms $4a$, $4b$, $4c$, $4d$, $4e$, $4f$, $4g$, $4h$ made of composite material forming the connecting member $1a$, $1b$, $1c$ and a step E2 of assembling the preforms $4a$, $4b$, $4c$, $4d$, $4e$, $4f$, $4g$, $4h$ by heat treatment to form the connecting member $1a$, $1b$, $1c$.

Nonlimitingly, the composite material comprises at least a matrix, such as a thermosetting or thermoplastic resin, associated with reinforcers, such as carbon fibers or glass fibers.

The composite material makes it possible at least to reduce the mass of the aircraft AC, to reduce the machining and finishing operations by comparison with forged metal connecting members, to eliminate corrosion, to eliminate potential dielectric effects, and to eliminate wear specific to the metal.

According to one embodiment, the heat treatment may correspond to a copolymerization or a co-curing which allows the preforms $4a$, $4b$, $4c$, $4d$, $4e$, $4f$, $4g$, $4h$ to be copolymerized. The copolymerization is well suited to composite materials of the thermosetting resin type.

According to another embodiment, the heat treatment may correspond to a co-consolidation which makes it possible to co-consolidate the preforms $4a$, $4b$, $4c$, $4d$, $4e$, $4f$, $4g$, $4h$. Co-consolidation is well suited to composite materials of the thermoplastic resin type.

The manufacturing step E1 may comprise a manufacturing substep E1$a$ that manufactures a main preform $4e$, $4h$ in the form of a strip which has a first longitudinal axis (not depicted) and which has a surface 5 and a surface 6 opposite to the first surface 5. FIG. 1 depicts one embodiment of the method of manufacturing a T-shaped connecting member $1b$, $1c$, in which method two manufacturing substeps E1$b$ and one manufacturing substep E1$a$ are implemented. However, it will be appreciated that the number of manufacturing substeps E1$b$ and the number of manufacturing substeps E1$a$ depend on the shape of the connecting member that is to be manufactured.

The manufacturing step E1 may also comprise at least one manufacturing substep E1$b$ that manufactures at least one L shaped preform $4a$, $4b$, $4c$, $4d$, $4f$, $4g$. The L-shaped preform $4a$, $4b$, $4c$, $4d$, $4f$, $4g$ corresponds to a profile section having a second longitudinal axis (not depicted). The transverse section of the L-shaped preform $4a$, $4b$, $4c$, $4d$, $4f$, $4g$ also has an L shape comprising a first web $7a$, $8a$, $9a$, $10a$, $11a$, $12a$ perpendicular to a second web $7b$, $8b$, $9b$, $10b$, $11b$, $12b$.

In addition, the first web $7a$, $8a$, $9a$, $10a$, $11a$, $12a$ may have the same length for each of the L shaped preforms $4a$, $4b$, $4c$, $4d$, $4f$, $4g$.

Advantageously, the preforms $4a$, $4b$, $4c$, $4d$, $4e$, $4f$, $4g$, $4h$ are manufactured in such a way that the main preform $4e$, $4h$ has ends which lie flush with the second webs $7b$, $8b$, $9b$, $10b$, $11b$, $12b$ of the L-shaped preforms $4a$, $4b$, $4c$, $4d$, $4f$, $4g$ when the preforms $4a$, $4b$, $4c$, $4d$, $4e$, $4f$, $4g$, $4h$ are assembled. Furthermore, the L-shaped preforms $4a$, $4b$, $4c$, $4d$, $4f$, $4g$ may also have ends that lie flush with one another.

Advantageously, the substep E1$a$ comprises the manufacture of a main preform $4e$, $4h$ and the substep E1$b$ comprises the manufacture of at least two L-shaped preforms $4a$, $4b$, $4c$, $4d$, $4f$, $4g$ which are intended to be adjacent to one another.

The assembly step E2 then comprises at least the assembly by heat treatment:

of the second web $7b$, $8b$, $9b$, $10b$, $11b$, $12b$ of the at least two L shaped preforms $4a$, $4b$, $4c$, $4d$, $4f$, $4g$ to the first surface 5 of the main preform $4e$, $4h$, of the first web $7a$, $8a$, $9a$, $10a$, $11a$, $12a$ of one of the two L shaped preforms $4a$, $4b$, $4c$, $4d$, $4f$, $4g$ to the first web $7a$, $8a$, $9a$, $10a$, $11a$, $12a$ of the other of the two L shaped preforms $4a$, $4b$, $4c$, $4d$, $4f$, $4g$.

This assembly thus allows all the surfaces of the preforms to be bonded together to form a solid connecting member $1a$, $1b$, $1c$: the first webs $7a$, $8a$, $9a$, $10a$, $11a$, $12a$ are bonded to one another and the second webs $7b$, $8b$, $9b$, $10b$, $11b$, $12b$ are bonded to the main preform $4e$, $4h$. That makes it possible to reinforce the monobloc structure of the connecting member $1a$, $1b$, $1c$.

The reinforcers, such as fibers, comprised in the preforms may be continuous along their entire length. Thus, the main preform $4e$, $4h$ has continuous reinforcers parallel to the first longitudinal axis and the L-shaped preforms $4a$, $4b$, $4c$, $4d$, $4f$, $4g$ have continuous reinforcers parallel to the second longitudinal axis. Thus, the reinforcers of the main preform $4a$, $4h$ allow a transfer of load from the wings 3 of the aircraft AC. Thanks to the continuity of the reinforcers from the first webs $7a$, $8a$, $9a$, $10a$, $11a$, $12a$ of the L shaped preforms $4a$, $4b$, $4c$, $4d$, $4f$, $4g$ to the second webs $7b$, $8b$, $9b$, $10b$, $11b$, $12b$, load is transmitted from the first webs to the second webs.

Figure 3:
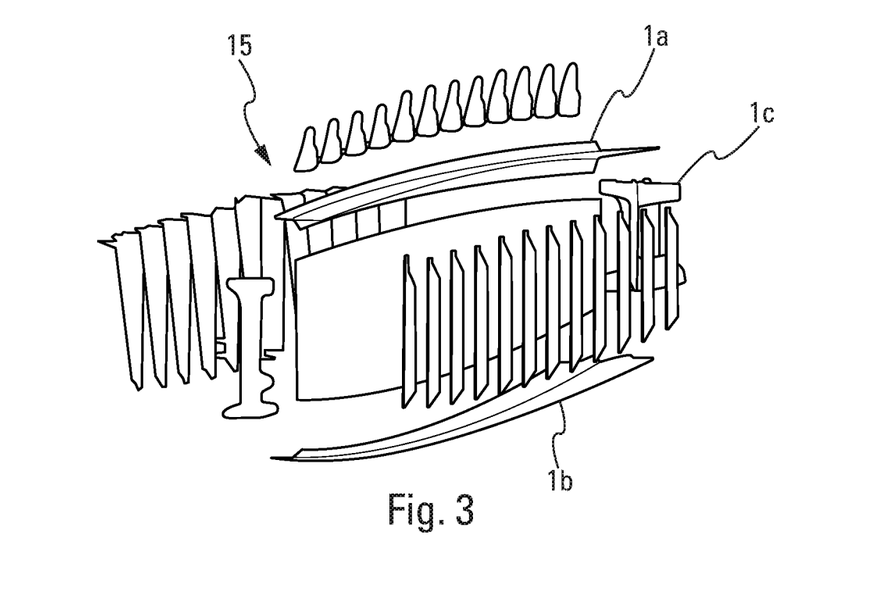
FIG. 3 depicts an exploded view of a root joint comprising connecting members.
Figure 4A:
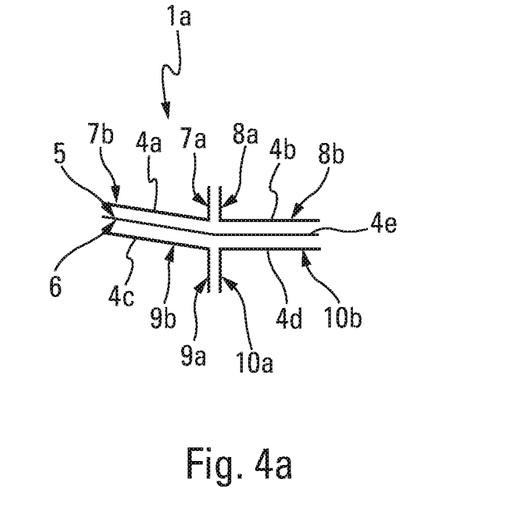
FIG. 4a depicts a transverse cross section through a cross-shaped connecting member the preforms of which are separated from one another.
Figure 4B:
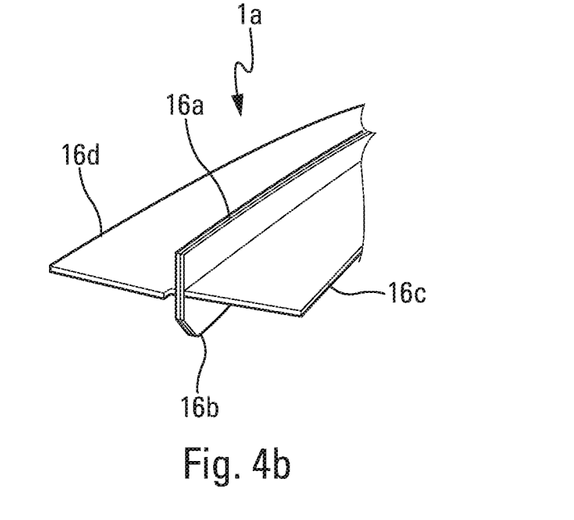
FIG. 4b depicts a perspective view of a portion of a cross-shaped connecting member of which the preforms are assembled.
Figure 5A:
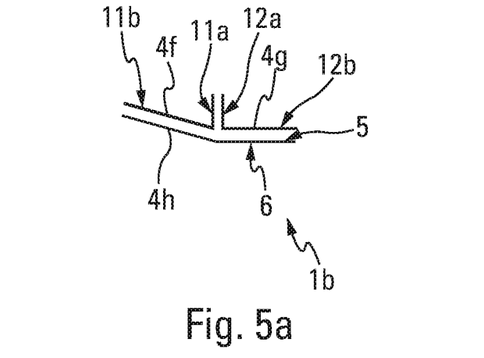
FIG. 5a depicts a transverse cross section of a T-shaped connecting member the preforms of which are separated from one another, according to a first configuration.
Figure 5B:
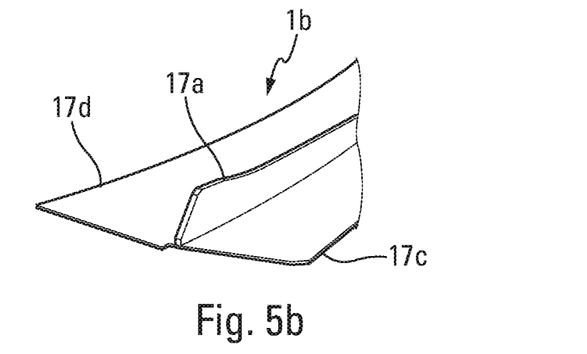
FIG. 5b depicts a perspective view of a portion of a T-shaped connecting member of which the preforms are assembled, according to the first configuration of FIG. 4a, FIG. 6a depicts a transverse cross section of a T-shaped connecting member of which the preforms are separated from one another, according to a second configuration.

The connecting member $1a$, $1b$, $1c$ of the root joint 15 (FIG. 3) that allows a wing 3 of an aircraft AC to be fixed to the center wing box 2 may have a transverse section of at least two shapes: a cross shape with four arms (in the case of a cross-shaped connecting member) or cruciform shape, as depicted in FIGS. 4$a$ and 4$b$, and a T shape (in the case of a T shaped connecting member), as depicted in FIGS. 5$a$, 5$b$, 6$a$ and 6$b$.

Nonlimitingly, the root joint 15 comprises at least one T-shaped connecting member $1b$, $1c$ and one cross-shaped connecting member $1a$.

The cross-shaped connecting member $1a$ may be used to contribute to connecting a wing 3 of an aircraft AC to the center wing box 2 as follows (FIG. 4$b$). One arm $16d$ of the cross of the cross-shaped connecting member $1a$ may be fixed to an extrados surface 18 of the wing 3. An arm $16c$ of the cross which is an arm opposite to the arm $16d$ of the cross may be fixed to a surface 22 of the center wing box 2 which is in the continuation of the extrados surface 18 of the wing 3. One arm $16a$ of the cross may be fixed to the surface 23 of the fuselage 17 of the aircraft AC. The arm $16b$ of the cross may be fixed to a surface 21 of the center wing box 2 substantially perpendicular to the surface 22 of the center wing box 2.

Figure 6A:
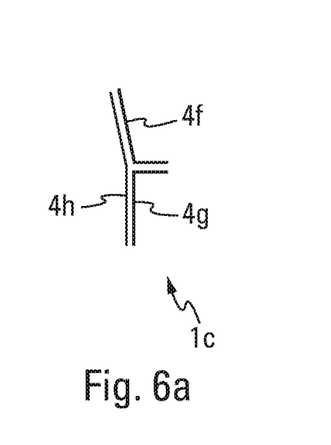
Figure 6B:
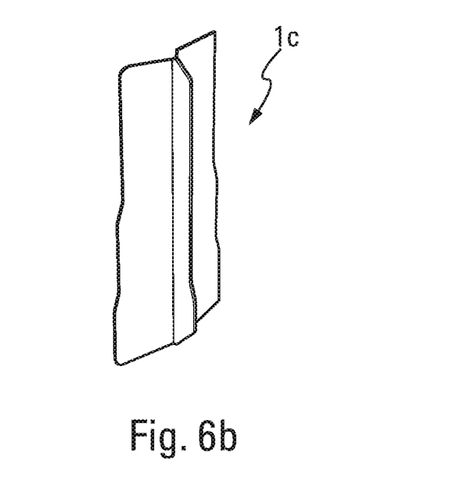
FIG. 6b depicts a perspective view of a portion of a connecting member of which the preforms are assembled, according to the second configuration of FIG. 5a, FIG. 7a depicts a view in cross section of a mold inserting a cross-shaped connecting member according to a first configuration.

A T-shaped connecting member 1b, which may contribute to connecting a wing 3 of an aircraft AC to the center wing box 2, may be fixed as follows (FIGS. 5b, 6b). One arm 17d of the crossbar of the T may be fixed to the intrados surface 19 of the wing 3. The arm 17c of the crossbar of the T may be fixed to a surface 20 of the center wing box 2 which is in the continuation of the intrados surface 19 of the wing 3. The vertical arm 17a of the T may be fixed to the surface 21 of the center wing box 2.

Thus, each preform has a specific load-transfer function.

Other cross-shaped or T-shaped connecting members 1c may be used to contribute to the connection of a wing 3 to the center wing box 2.

According to a first embodiment of the method, the step E1 of manufacturing a cross-shaped connecting member 1a may comprise a manufacturing substep E1a that manufactures one main preform 4e and four manufacturing substeps E1b that manufacture respectively an L-shaped preform 4a, an L-shaped preform 4b, an L-shaped preform 4c and an L-shaped preform 4d.

The assembly step E2 may comprise a substep E21 of assembling the preforms 4a, 4b, 4c, 4d, 4e manufactured in the manufacturing substeps E1a, E1b.

Figure 10:
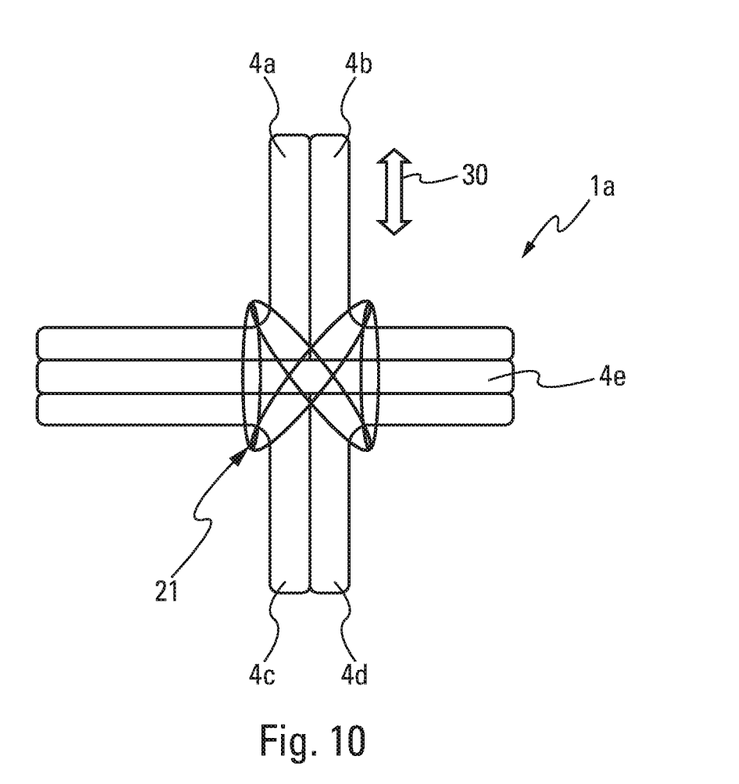
FIG. 10 depicts a transverse cross section of a cross-shaped connecting member of which the preforms forming the connecting member are secured to one another by the addition of reinforcing fibers by stitching.

The assembly step E2 may further comprise a stitching substep E22 which follows the preforms-assembly substep E21. The stitching substep E22 adds reinforcing fibers 21 by stitching to secure the preforms 4a, 4b, 4c, 4d, 4e to one another (FIG. 10).

The assembly step E2 may also comprise a heat treatment step E23 that heat treats the preforms 4a, 4b, 4c, 4d, 4e assembled in the assembly substep E21.

The preforms 4a, 4b, 4c, 4d, 4e are assembled, in the assembly substep E21, so that the connecting member 1a formed by the preforms 4a, 4b, 4c, 4d, 4e has a cruciform transverse section (FIG. 4a) by ensuring that:

the web 7a of the L-shaped preform 4a is butted against the web 8a of the L-shaped preform 4b, the web 7b of the L-shaped first preform 4a and the web 8b of the L shaped preform 4b are butted against the surface 5 of the main preform 4e, the web 9a of the L-shaped preform 4c is butted against the web 10a of the L-shaped preform 4d, the web 9b of the L-shaped preform 4c and the web 10b of the L shaped preform 4d are butted against the surface 6 of the main preform 4e, the first longitudinal axis of the main preform 4e is parallel to the second longitudinal axes of the L-shaped preforms 4a, 4b, 4c, 4d.

The web 7a of the L-shaped preform 4a butted against the web 8a of the L-shaped preform 4b together form the arm 16a of the cross.

The web 9a of the L-shaped preform 4c butted against the web 10a of the L-shaped preform 4d together form the arm 16b of the cross.

The web 7b of the L-shaped preform 4a and the web 8b of the L shaped preform 4b butted against the surface 5 of the main preform 4e and the web 9b of the L-shaped preform 4c and the web 10b of the L-shaped preform 4d butted against the surface 6 of the main preform 4e together respectively form the arm 16d and the arm 16c of the cross.

According to a second embodiment of the method, the step E1 of manufacturing a T-shaped connecting member 1b, 1c may comprise a manufacturing substep E1a that manufactures one main preform 4h and two manufacturing substeps E1b that manufacture respectively an L-shaped preform 4f and an L-shaped preform 4g.

The assembly step E2 may comprise a substep E21 of assembling the performs 4f, 4g, 4h, manufactured in the manufacturing substeps E1a, E1b.

The assembly step E2 may further comprise a stitching substep E22 which follows the preforms-assembly substep E21. The stitching substep E22 adds reinforcing fibers 21 by stitching to secure the preforms 4f, 4g, 4h to one another (FIG. 10).

The assembly step E2 may also comprise a heat treatment step E23 that heat treats the preforms 4f, 4g, 4h assembled in the assembly substep E21.

The preforms 4f, 4g, 4h are assembled, in the assembly substep E21, so that the connecting member 1b, 1c formed by the preforms 4f, 4g, 4h has a T-shaped transverse section (FIGS. 5a, 6a) by ensuring that:

the web 11a of the L-shaped preform 4f is butted against the web 12a of the L-shaped preform 4g, the web 11b of the L-shaped preform 4f and the web 12b of the L shaped preform 4g are butted against the surface 5 of the main preform 4h, the first longitudinal axis of the main preform 4h is parallel to the second longitudinal axes of the L-shaped preforms 4f, 4g.

The web 11a of the L-shaped preform 4f butted against the web 12a of the L-shaped preform 4g together form the vertical arm 17a of the T.

The web 11b of the L-shaped preform 4f and the web 12b of the L shaped preform 4g butted against the surface 5 of the main preform 4h form the crossbar of the T.

Advantageously, the L-shaped and T-shaped preforms 4a, 4b, 4c, 4d, 4e, 4f, 4g, 4h manufactured in the manufacturing step E1 are manufactured by continuous forming. The continuous-forming manufacture of the preforms 4a, 4b, 4c, 4d, 4e, 4f, 4g, 4h may be manufacturing by extrusion or by pultrusion.

Advantageously, the manufacturing substep E1b manufactures the L-shaped preforms 4a, 4b, 4c, 4d, 4f, 4g by pultrusion.

For that, the manufacturing substep E1b may comprise:

a continuous manufacturing substep E1b1 that continuously manufactures a strip made of composite material formed of a superposition of fiber plies comprising the web 7a, 8a, 9a, 10a, 11a, 12a and the web 7b, 8b, 9b, 10b, 11b, 12b, a continuous folding substep E1b2 that continuously folds the strip in such a way that the web 7a, 8a, 9a, 10a, 11a, 12a becomes perpendicular to the web 7b, 8b, 9b, 10b, 11b, 12b so as to form the L shaped profile section 4a, 4b, 4c, 4d, 4f, 4g.

The continuous manufacturing substep E1b1 may be performed using an automated fiber placement (AFP) method.

The folding substep E1b2 may be performed by a device that allows continuous progressive folding of the strip until the strip is folded at an angle substantially equal to 90°.

For preference, the external angle of the fold corresponds to a sharp corner, which means to say that the external angle of the fold has a curvature substantially equal to 0° or close to 0°.

For that, the continuous manufacturing substep E1b1 may comprise a substep (not depicted) of incorporating additional fiber plies between the fiber plies of the strip made of composite material, in a region of the strip corresponding to the web 7a, 8a, 9a, 10a, 11a, 12a after the continuous folding substep E1b2.

The manufacturing substep E1b may further comprise a bending substep E1b3 following the continuous folding substep E1*b*2. The bending substep E1*b*3 amounts to curving the L-shaped profile section in the direction of the second longitudinal axis so that the web 7*b*, 8*b*, 9*b*, 10*b*, 11*b*, 12*b* becomes curved and the web 7*a*, 8*a*, 9*a*, 10*a*, 11*a*, 12*a* remains planar. This curvature makes it possible to take account of the curvature of the profile of the wing 3 starting from the front and progressing toward the rear in the direction of travel D of the aircraft AC.

The bending may be performed after the folding by setting the L shaped profile section down on a curved rig so that the L-shaped profile section follows the shape of the rig and adopts the curvature of the rig.

As a preference, during the continuous manufacturing substep E1*b*1, the strip is manufactured in such a way that the first web 7*a*, 8*a*, 9*a*, 10*a*, 11*a*, 12*a* of the L-shaped preform or preforms 4*a*, 4*b*, 4*c*, 4*d*, 4*f*, 4*g* comprises a collection of fibers having a direction making a nonzero angle with respect to the second longitudinal axis of the preform or preforms 4*a*, 4*b*, 4*c*, 4*d*, 4*f*, 4*g*.

Nonlimitingly, the collection of fibers comprises a subset of fibers of which the direction is perpendicular to the second longitudinal axis, a subset of fibers of which the direction is substantially equal to 30° with respect to the second longitudinal axis, and a set of fibers of which the direction is substantially equal to −30° with respect to the second longitudinal axis.

In the assembly step E2, the stitching substep E22 may be employed, if necessary, in the event of high transverse load 30 on the connecting member 1*a*, 1*b*, 1*c*. The double-ended arrow 30 depicted in FIG. 10 indicates an example of the direction and sense of the transverse load that may be applied to a connecting member 1*a*. Advantageously, the reinforcing fibers 21 are added by stitching in a central region to the preforms 4*a*, 4*b*, 4*c*, 4*d*, 4*f*, 4*g*. For example, the stitching follows the line where the first web 7*a*, 8*a*, 9*a*, 10*a*, 11*a*, 12*a* and the second web 7*b*, 8*b*, 9*b*, 10*b*, 11*b*, 12*b* meet.

Nonlimitingly, the reinforcing fibers 21 correspond to carbon fibers or glass fibers.

The heat treatment substep E23 makes it possible to heat treat all the preforms 4*a*, 4*b*, 4*c*, 4*d*, 4*e*, 4*f*, 4*g*, 4*h* assembled in the assembly substep E21, and join them together. As explained previously in the description, the heat treatment may correspond to a copolymerization or a co-consolidation.

The copolymerization or the co-consolidation may correspond to a thermal curing of the resin of the composite material in an autoclave.

Figure 7A:
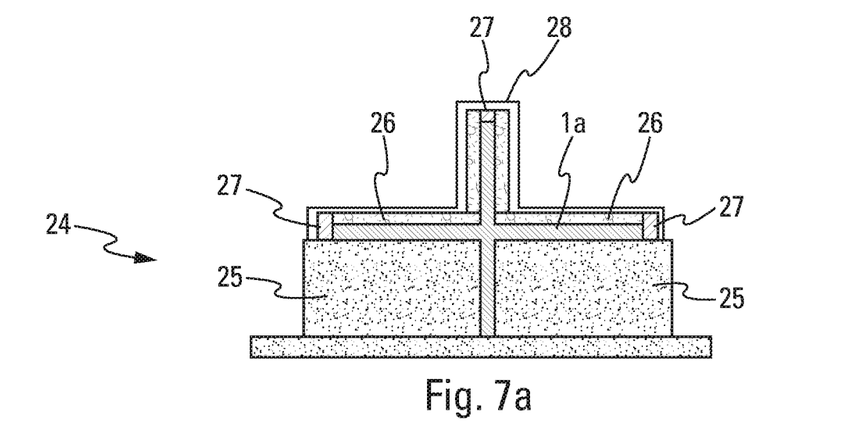
Figure 7B:
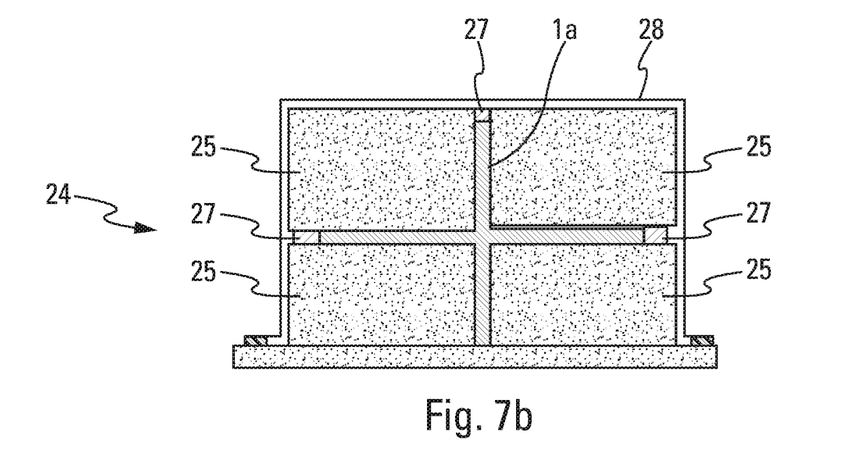
FIG. 7b depicts a view in cross section of a mold inserting a cross-shaped connecting member according to a second configuration.
Figure 7C:
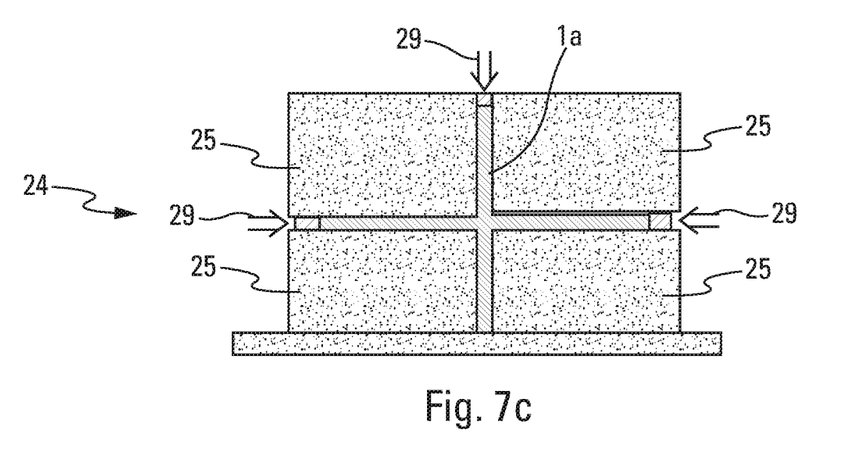
FIG. 7c depicts a view in cross section of a mold inserting a cross-shaped connecting member according to a third configuration.

The heat treatment substep E23 may be performed by means of a mold 24 into which the preforms 4*a*, 4*b*, 4*c*, 4*d*, 4*e*, 4*f*, 4*g*, 4*h* assembled in the assembly substep E21 are inserted. FIGS. 7*a*, 7*b* and 7*c* each depict a mold 24 inserting a cross-shaped connecting member 1*a*. However, it will be appreciated that a suitable mold can insert a T-shaped connecting member 1*b*, 1*c*.

According to a first embodiment (FIG. 7*a*), the mold 24 may comprise metal shaping plates 25 supplemented by flexible shaping plates 26. The mold openings are closed by edge bars 27. All of this is enclosed in a bag 28 before a pressure is applied using an autoclave.

According to a preferred second embodiment (FIG. 7*b*), the mold 24 comprises only metal shaping plates 25 the openings of which are closed by edge bars 27. Like in the first embodiment, everything is enclosed in a bag 28 before a pressure is applied using an autoclave.

According to a third embodiment (FIG. 7*c*), the mold 24 comprises only metal shaping plates 25. Pressure 29 is applied via the openings of the mold using a same quality resin transfer molding (SQRTM) technique. In this embodiment, the bag and the autoclave are not required.

The manufacturing method may further comprise a finishing step E3 following the assembly step.

Figure 8:
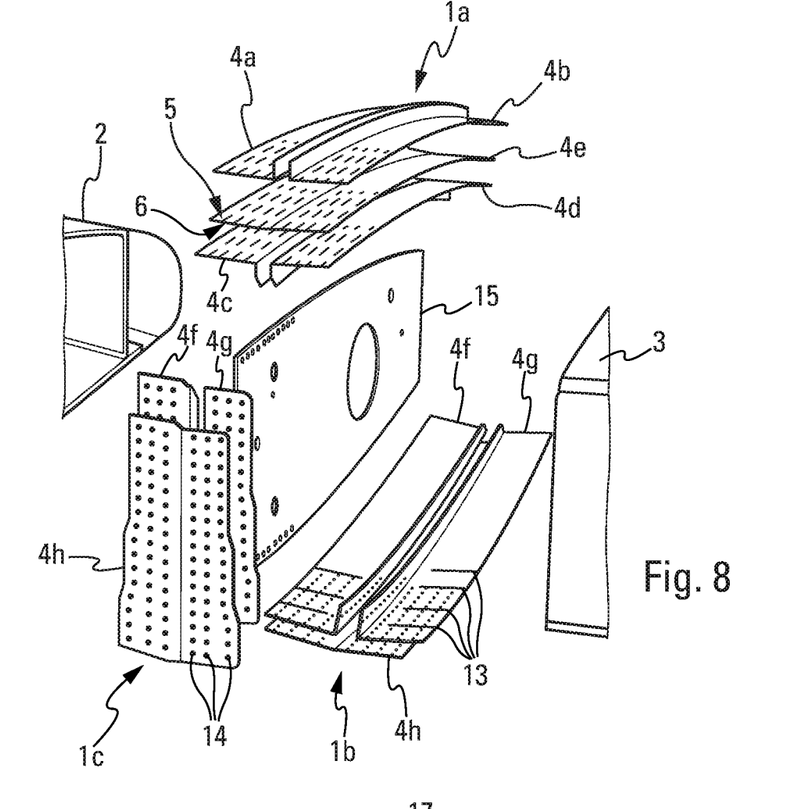
FIG. 8 depicts an exploded view of a root joint comprising preforms forming connecting members.
Figure 11:
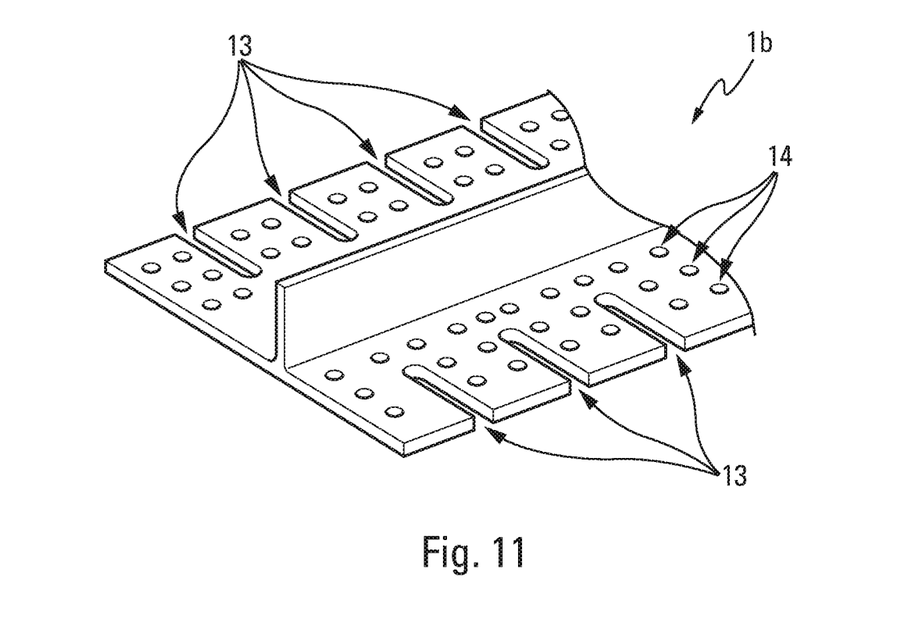
FIG. 11 depicts an assembled T-shaped connecting member.

The finishing step E3 comprises:

a substep E3*a* of machining fixing holes 14 (FIGS. 8 and 11) configured to fix the connecting member 1*a*, 1*b*, 1*c* to the center wing box 2 and to a wing 3 of the aircraft AC, a substep E3*b* of machining insertion slots 13 (FIGS. 8 and 11) which are configured for inserting alignment ribs arranged on the center wing box 2 and/or on the wing 3.

The alignment ribs may correspond to panel stiffeners arranged on the center wing box 2 and/or on the wing 3.

In this way, the connecting members 1*a*, 1*b*, 1*c* can be aligned using the insertion slots 13 and can be fixed to the center wing box 2, to the fuselage 17 and to the wing 3 using fixing devices such as screws and nuts 29 or rivets inserted in the fixing holes 14.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for manufacturing a connecting member configured to contribute to the connection between a center wing box of an aircraft and a wing of the aircraft, the method comprising the steps of:

manufacturing a plurality of preforms made of composite material forming the connecting member, wherein the manufacturing step comprises:

a first manufacturing substep to manufacture a main preform of the plurality of preforms in the form of a strip having a first longitudinal axis and having a first surface opposite to a second surface; and four second manufacturing substeps to manufacture a first L-shaped preform, a second L-shaped preform, a third L-shaped preform, and a fourth L-shaped preform of the plurality of preforms, each L-shaped preform corresponding to an L-shaped profile section having a second longitudinal axis, the transverse cross section of which is L-shaped comprising a first web perpendicular to a second web; and assembling the plurality of preforms by heat treatment in order to form the connecting member, the assembly step comprising:

a preforms-assembly substep comprising assembling the main preform and the first, second, third, and fourth L-shaped preforms manufactured in the first manufacturing substep and the second manufacturing substep, the main preform and the first, second, third, and fourth L-shaped preforms being assembled so that the connecting member formed by the main preform and the first, second, third, and fourth L-shaped preforms has a cruciform transverse cross-section by ensuring that:

the first web of the first L-shaped preform is butted against the first web of the second L-shaped preform, the second web of the first L-shaped preform and the second web of the second L-shaped preform are butted against the first surface of the main preform, the first web of the third L-shaped preform is butted against the first web of the fourth L-shaped preform, the second web of the third L-shaped preform and the second web of the fourth L-shaped preform are butted against the second surface of the main preform, the first longitudinal axis of the main preform is parallel to the second longitudinal axes of the first, second, third, and fourth L-shaped preforms, and heat treating the main preform and the first, second, third, and fourth preforms assembled in the assembly step.

2. The method as claimed in claim 1, the main preform has ends which lie flush with the second web of the first L-shaped preform and the second web of the second L-shaped preform when the main preform, the first L-shaped preform, and the second L-shaped preform are assembled, the first and second L-shaped preforms having ends which lie flush with one another.

3. The method as claimed in claim 1, wherein the main preform has continuous reinforcers parallel to the first longitudinal axis, and the first, second, third, and fourth L-shaped preforms have continuous reinforcers parallel to the second longitudinal axis.

4. The method as claimed in claim 1, wherein the assembling step further comprises a stitching substep following the substep of assembling the main preform and the first, second, third, and fourth L-shaped preforms, the stitching substep comprising adding reinforcing fibers by stitching in order to attach the main preform and the first, second, third, and fourth L-shaped preforms to one another.

5. The method as claimed in claim 1, wherein the manufacturing step comprises manufacturing the main preform the first, second, third, and fourth L-shaped preforms by continuous forming.

6. The method as claimed in claim 1, wherein the second manufacturing substep comprises manufacturing the first L-shaped preform by pultrusion, the second manufacturing substep comprising:
   a continuous manufacturing substep that continuously manufactures a strip made of composite material formed of a superposition of plies of fibers comprising the first web and the second web; and
   a continuous folding substep that continuously folds the strip in such a way that the first web becomes perpendicular to the second web in order to form the L-shaped profile section of the first L-shaped preform.

7. The method as claimed in claim 6, wherein the second manufacturing substep further comprises a bending substep following the continuous folding substep, the bending substep comprising curving the L-shaped profile section of the first L-shaped preform in the direction of the second longitudinal axis so that the second web becomes curved and the first web remains planar.

8. The method as claimed in claim 6, wherein, during the continuous manufacturing substep, the strip is manufactured in such a way that the first web of the first L-shaped preform comprises a collection of fibers having a direction that makes a non-zero angle with respect to the second longitudinal axis of the first L-shaped preform.

9. The method as claimed in claim 6, wherein the continuous manufacturing substep comprises a substep of incorporating additional fiber plies between the fiber plies of the strip made of composite material, in a region of the strip that corresponds to the first web after the folding substep.

10. The method as claimed in claim 1, wherein said method further comprises a finishing step following the assembling step, the finishing step comprising:
   a substep of machining fixing holes, the fixing holes being configured to fix the connecting member at least to the center wing box and to the wing of the aircraft; and
   a substep of machining insertion slots which are configured for inserting alignment ribs arranged on the center wing box and on the wing.

11. The method as claimed in claim 1, wherein the heat treatment corresponds to a copolymerization or a co-consolidation.

12. The method as claimed in claim 1, wherein the first L-shaped preform has reinforcers having continuity from the first web to the second web.

\* \* \* \* \*